Patented Apr. 16, 1935

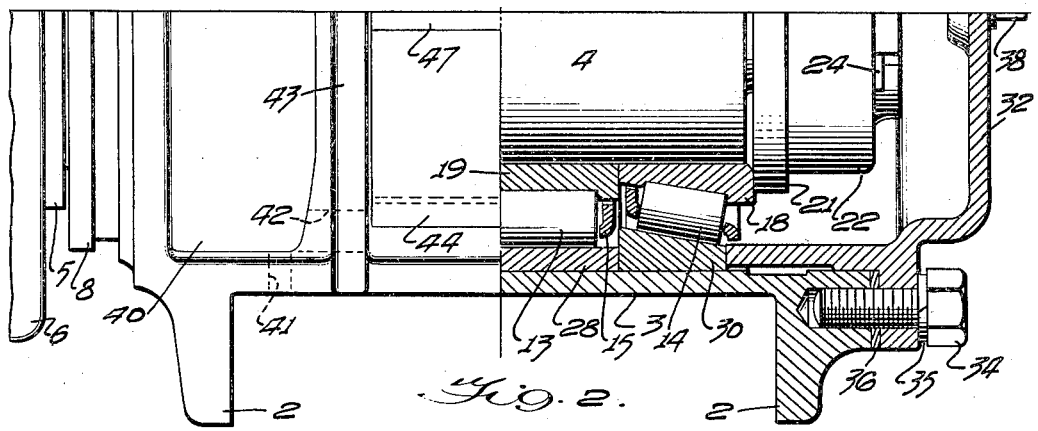
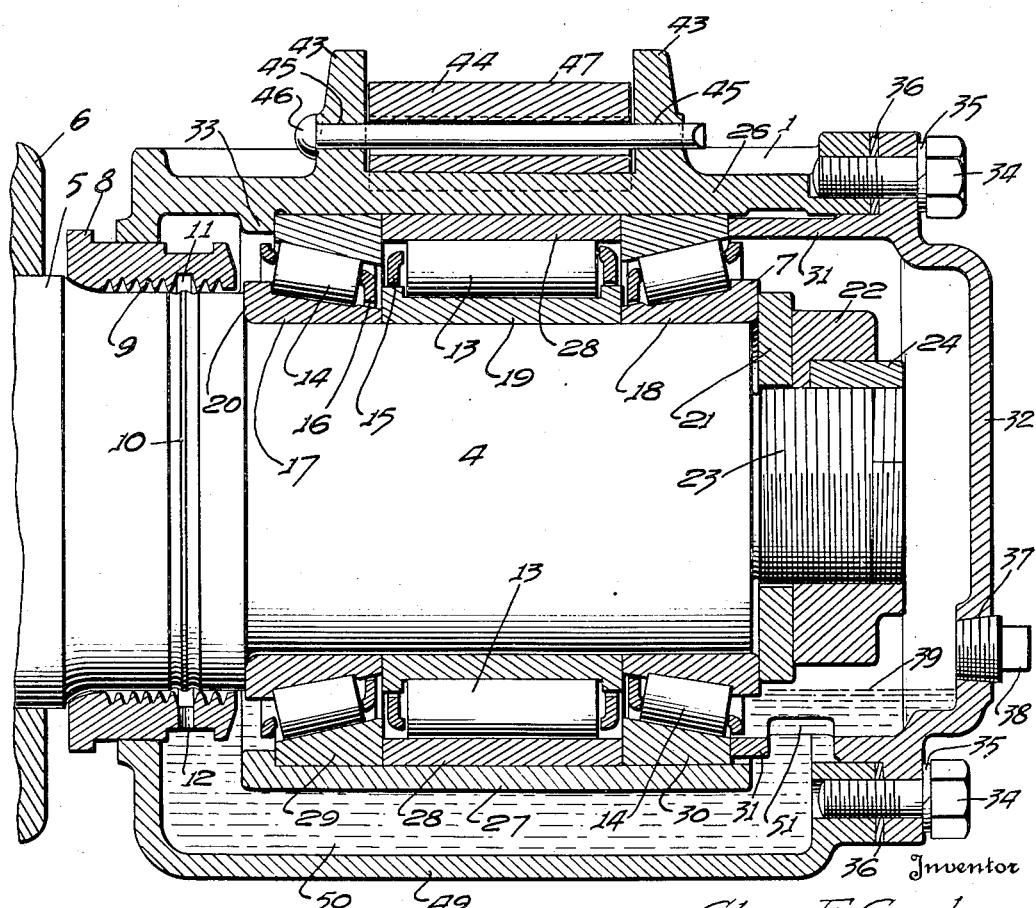

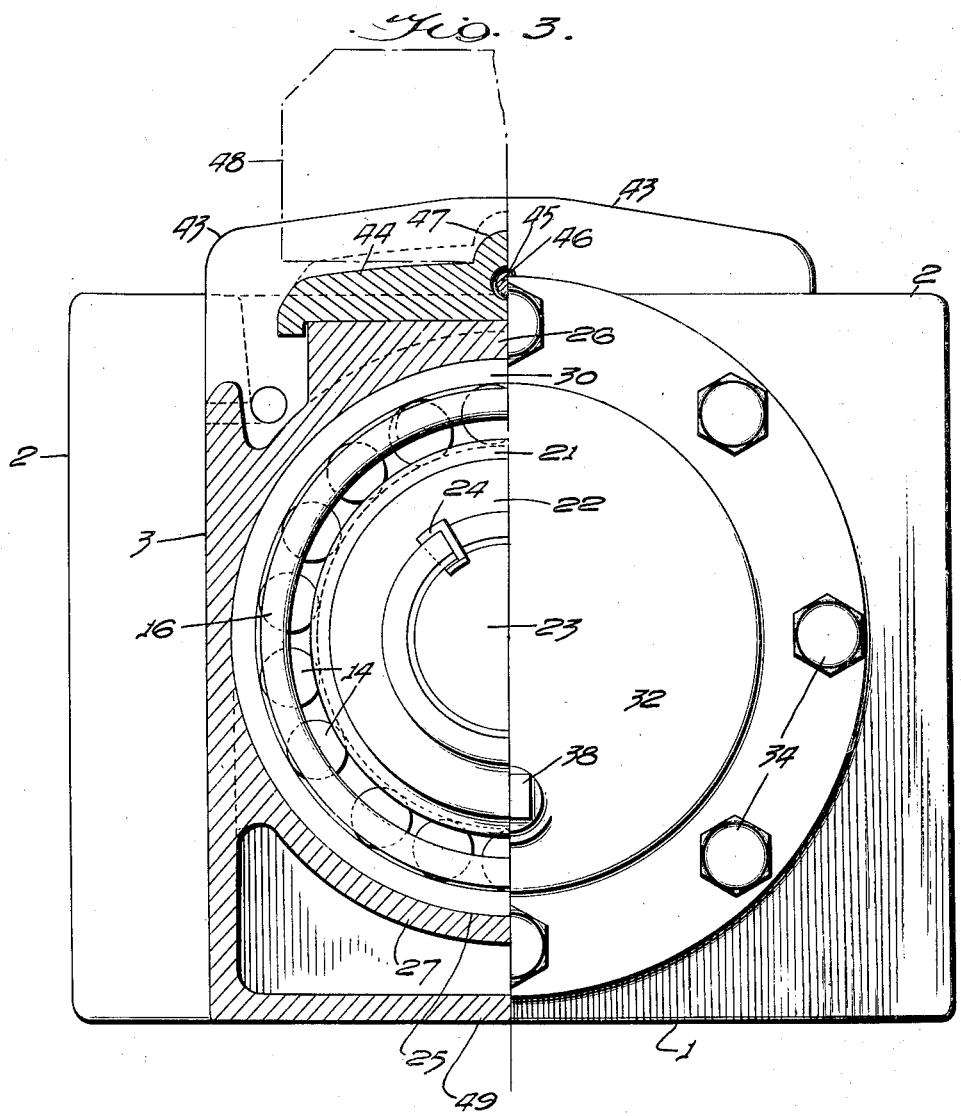

1,997,573

UNITED STATES PATENT OFFICE 1,997,573

JOURNAL BOX

Glenn F. Couch, Rochester, N. Y., assignor to The Symington Company, New York, N. Y., a corporation of Maryland Application April 1, 1930, Serial No. 440,812

7 Claims. (Cl. 308—180)

This invention relates to journal boxes, and more particularly to such provided with anti-friction bearings disposed between said boxes and associated journals.

The principal object of my invention, generally considered, is to provide an anti-friction bearing assembly involving cylindrical rollers and conical rollers so arranged and of such relative sizes that the position of the conical rollers with respect to the cylindrical rollers varies as the journal rotates, so that a different series of conical and cylindrical rollers is under pressure at every cycle of revolution, whereby the service life of the bearing is increased.

Another object of my invention is to provide an anti-friction bearing involving a series of cylindrical rollers with a series of conical rollers on either side thereof, said cylindrical rollers being adapted to take the main pressure between the journal and box, and the conical rollers being adapted to take care of end thrust and supplement the cylindrical rollers for taking some of the main pressure.

A further object of my invention is to provide a journal box the roof of which has pockets to receive oil waste separated by a pocket to receive an equalizer seat member.

Other objects and advantages of the invention relating to the particular arrangement and construction of the various parts will become apparent as the description proceeds.

Referring to the drawings illustrating my invention, the scope whereof is defined by the appended claims:—

Figure 1 is a transverse sectional view of a journal box and anti-friction bearing assembly, the associated journal being shown in side elevation.

Fig. 2 is a partial plan and partial horizontal sectional view of the journal box and parts contained therein, as shown in Fig. 1.

Fig. 3 is a partial end elevation and partial transverse sectional view of the journal box and parts therein shown in the preceding figures.

Referring to the drawings in detail, like parts being designated by like reference characters, there is shown a journal box 1 which, in the present embodiment, has outstanding flanges 2 providing channels 3 on either side thereof adapted to engage the legs or depending portions of a truck pedestal (not shown), thereby providing the usual pedestal ways. Normally received in the journal box 1 is a journal 4 extending from an axle 5 on which may be mounted wheels 6, only a fragmentary portion of one of which is shown. Although only one end of the axle 5 is illustrated, it will be understood that the other end may be of a similar construction and associated with a similar journal box.

Disposed between the journal 4 and the box 1 is an anti-friction roller bearing assembly 7. For closing the annular space between the journal 4 and box 1, a bushing 8 is desirably provided, as shown, the inner surface of which is preferably ribbed or corrugated, as indicated at 9, to minimize loss of oil thereby. That portion of the journal adjacent the corrugations 9 is desirably formed with a rib 10 acting as oil-throwing means for discharging oil, which might tend to flow between the bushing 8 and journal 4, into the channel 11 in said bushing, from whence it is adapted to drain back into the box through the aperture 12.

The anti-friction bearing assembly in the present embodiment comprises cylindrical rollers 13 and conical rollers 14, the series of rollers 13 and cage 15 having desirably on both sides the rollers 14 and cages 16. The inner races or bearing bushings for the rollers desirably abut one another, as illustrated, and the bushings or cones 17 and 18 separated by the bushing 19 are desirably held in place on the journal against the shoulder 20 by means of a washer 21 and nut 22 threadably engaging the reduced end portion 23 of the journal 4. Locking means 24 of any desired character, for example, such as described and claimed in my co-pending application Serial No. 406,424, filed November 11, 1929, may be used to prevent undesired loosening of the nut.

The interior of the journal box 1 is formed with a cylindrical cavity 25 between the top wall 26 and an intermediate curved wall 27, and in said cavity is desirably secured the outer bushing 28 and cones 29 and 30 for the cylindrical roller bearing and the conical roller bearings, respectively. These roller bearing parts or races are all desirably held in place by the inwardly extending annular flange 31 on the cover or lid 32 which urges said races into tight engagement with the shouldered portion 33 on the box by pressing the outer cone 30. The lid 32 is desirably secured in place by a plurality of tap bolts 34 with locking washers 35, a gasket 36 being desirably interposed between the lid and the outer edge of the box to form an oil-tight construction. The lid is desirably provided with a filling aperture 37 closed by a threaded plug 38, the level of the oil 39 being desirably maintained substantially as indicated, that is, at approximately the bottom of the filling aperture 37.

In order to provide for properly lubricating the pedestal ways 3, the roof of the box desirably has pockets 40 disposed adjacent the front and rear portions thereof, which pockets are adapted to receive oil waste, ports 41 being provided to permit the seepage of oil to the pedestal ways, ports 42 being desirably provided to equalize the oil between the front and rear pockets. That portion of the box roof between the pockets desirably has upstanding flanges 43 between which is normally mounted an equalizer seat 44 connected to said box by a pin or cotter 46 passing through apertures 45 and flanges 43. The seat 44 desirably has an upstanding rib or flange 47 transverse to the flanges 43 to provide for interlocking with respect to said equalizer diagrammatically shown at 48.

The lower portion of the box 1 between the intermediate web 27 and the bottom wall 49 provides a reservoir adapted to contain oil or other lubricating material, the pocket 50 thus provided extending from front to rear of the box for equalizing the oil level. The annular flange 31 on the lid is desirably apertured, as indicated at 51, to avoid closing the front portion of the oil reservoir 50.

From the foregoing disclosure, it will be seen that I have devised an improved anti-friction journal box particularly adapted for use on railway rolling stock and provided not only for taking vertical loads, but also for end thrust between said journal and box. The box is designed to provide an adequate oil reservoir, the oil being positioned at such a low level that it will normally not be lost out of the box while the vehicle is standing still, and while in motion, provision is also made for preventing loss of oil by an oil-throwing rib on the journal.

The cylindrical and conical rollers may be disposed at approximately the same distance from the axis of the journal, but are desirably so formed that the ratio of the diameter of the conical rollers to the corresponding pitch diameter is slightly greater than the corresponding ratio with respect to the cylindrical rollers, or vice versa, so that as the journal rotates, the cylindrical and conical rollers travel around the races or bushings at different rates of speed, whereby a different series of rollers is under pressure at every cycle of revolution. In this way, the service life of the bearing is increased, as will be understood by those skilled in the art.

Although I have described a preferred embodiment of my invention, it will be understod that the same is merely illustrative and not limiting, and modifications may be made within the scope of the appended claims.

I claim:—

1. In combination, a journal box, a journal therein, a cover adapted to close the outer opening in said box, anti-friction bearing cones separated by an anti-friction bearing bushing mounted inside of said box, said cover having an inwardly extending annular flange engaging the outer bearing cone for pressing it and the associated bushing and cone against a shouldered portion of the box, cylindrical roller bearing means engaging said bushing, and conical roller bearing means engaging said cones and disposed between said journal and box, said cylindrical bearing means being adapted to take the main load and the conical roller bearing means being adapted to take care of end thrust.

2. In combination, a journal box, a journal rotatably mounted therein, a pair of anti-friction bearing cones separated by an anti-friction bearing bushing mounted on said journal and engaging a shoulder thereon, a nut threadably engaging an end portion of said journal for holding said cones and bushing in place, cylindrical roller bearing means disposed between said journal and box and engaging said bushing, and conical roller bearing means disposed between said journal and box and engaging said cones.

3. In combination, a journal box, a journal therein, a cover adapted to close the outer opening of said box, roller bearing cones separated by a roller bearing cylindrical bushing mounted inside of said box, said cover having a flange portion normally engaging the outer bearing cone for pressing it and the associated bushing and cone against a shouldered portion of the box, cylindrical roller bearing means disposed radially inward of and engaging said bushing, and conical roller bearing means disposed radially inward of and engaging said cones, said roller bearing means serving to separate said journal and box and provide for anti-friction movement of said journal, said cylindrical roller bearing means being adapted to take part of the main load and said conical roller bearing means being adapted to take care of end thrust and the remainder of the main load, the ratios between the roller diameters and the corresponding pitch diameters differing for the cylindrical and conical rollers, whereby said rollers have different circumferential speeds.

4. In combination, a journal box, a journal therein, a pair of roller bearing cones separated by a roller bearing cylindrical bushing mounted on said journal and engaging a shouldered portion thereof, a nut threadably engaging an end portion of said journal for holding said cones and bushing in place, cylindrical roller bearing means disposed between said journal and box and engaging said bushing, and conical roller bearing means disposed radially outward of and engaging said cones between said journal and box, said cylindrical roller bearing means being adapted to take the greater part of the main load and said conical roller bearing means being adapted to take care of end thrust and the remainder of the main load, the ratios between the roller diameters and the corresponding pitch diameters differing for the cylindrical and conical rollers, whereby said rollers have different circumferential speeds.

5. In combination, a journal box, a journal therein, a cover for said box, roller bearing cones separated by a roller bearing cylindrical bushing mounted inside of said box, said cover engaging the adjacent cone for pressing it and the associated bushing and cone against the box, a pair of roller bearing cones separated by a roller bearing cylindrical bushing mounted on said journal, a nut on said journal for holding said cones and bushing in place, said journal bushing being disposed radially of said box bushing and said journal cones being respectively disposed radially of said box cones, cylindrical rollers mounted between said bushings, and conical rollers mounted between said cones, said cylindrical roller bearing means being adapted to take the main load and said conical roller bearing means being adapted to take care of end thrust, the ratios between the roller diameters and the corresponding pitch diameters differing for the cylindrical and conical rollers, whereby said rollers have different circumferential speeds.

6. In combination, a journal box, a journal therein, a cover for said box, roller bearing cones separated by a roller bearing cylindrical bushing mounted inside of said box, said cover engaging the adjacent cone for pressing it and the associated bushing and cone against the box, a pair of roller bearing cones separated by a roller bearing cylindrical bushing mounted on said journal, a nut on said journal for holding said cones and bushing in place, said journal bushing being disposed radially of said box bushing and said journal cones being respectively disposed radially of said box cones, cylindrical rollers mounted between said bushings, and conical rollers mounted between said cones.

7. In combination, a journal box, a journal therein, anti-friction means disposed between said journal and box, an annular bushing mounted on said box and substantially closing the space around said journal where it enters said box, said bushing being provided with circumferential inwardly extending corrugations for minimizing the loss of oil thereby, said corrugations being divided into two sets by a trough draining into the box, said journal being formed with an oil throwing rib disposed in the plane of said trough between grooves on said journal to minimize loss of oil from the box.

GLENN F. COUCH.